United States Patent
Tang et al.

(10) Patent No.: US 10,845,907 B2
(45) Date of Patent: Nov. 24, 2020

(54) DISPLAY PANEL

(71) Applicant: Wuhan China Star Optoelectronics Technology Co., Ltd., Wuhan (CN)

(72) Inventors: Yuejun Tang, Wuhan (CN); Xueyun Li, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/347,820

(22) PCT Filed: Mar. 25, 2019

(86) PCT No.: PCT/CN2019/079557
§ 371 (c)(1),
(2) Date: May 7, 2019

(87) PCT Pub. No.: WO2020/107757
PCT Pub. Date: Jun. 4, 2020

(65) Prior Publication Data
US 2020/0174605 A1    Jun. 4, 2020

(30) Foreign Application Priority Data

Nov. 30, 2018    (CN) .......................... 2018 1 1454661

(51) Int. Cl.
| | | |
|---|---|---|
| G06F 3/041 | (2006.01) | |
| G06F 3/044 | (2006.01) | |
| G06F 3/047 | (2006.01) | |
| H01L 27/32 | (2006.01) | |
| H01L 51/52 | (2006.01) | |
| H01L 51/44 | (2006.01) | |
| G02F 1/1333 | (2006.01) | |

(52) U.S. Cl.
CPC ............ *G06F 3/0412* (2013.01); *G06F 3/047* (2013.01); *G06F 3/0445* (2019.05); *G06F 3/0448* (2019.05); *G02F 1/13338* (2013.01); *G06F 2203/04103* (2013.01); *G06F 2203/04111* (2013.01)

(58) Field of Classification Search
CPC .... G06F 3/0412; G06F 3/0445; G06F 3/0448; G06F 3/047
USPC ......................................... 365/173
See application file for complete search history.

(56) References Cited

U.S. PATENT DOCUMENTS

| | | | | |
|---|---|---|---|---|
| 9,874,967 | B2* | 1/2018 | Wu ................. | G06F 3/0416 |
| 10,126,585 | B2* | 11/2018 | Kimura ............ | G06F 3/0412 |
| 2012/0268423 | A1* | 10/2012 | Hotelling ......... | G09G 3/3648 |
| | | | | 345/174 |
| 2014/0368750 | A1* | 12/2014 | Liao ................ | G06F 3/044 |
| | | | | 349/12 |
| 2015/0331530 | A1* | 11/2015 | Kim ................ | G06F 3/044 |
| | | | | 345/174 |
| 2016/0370944 | A1* | 12/2016 | Zhao .............. | G06F 3/0412 |
| 2017/0115758 | A1* | 4/2017 | Lee ................. | G06F 3/044 |
| 2017/0277315 | A1* | 9/2017 | Wu ................. | G06F 3/044 |

(Continued)

*Primary Examiner* — Ly D Pham

(57) ABSTRACT

The present disclosure provides a display panel. The display panel includes a substrate, a touch functional layer, and an array functional layer. The substrate includes a first substrate layer and a second substrate layer formed on the first substrate layer. The array functional layer is disposed on the substrate. At least one touch functional layer is formed between the first substrate layer and the second substrate layer, to implement in-cell touch on the display panel.

20 Claims, 4 Drawing Sheets

(56) References Cited

U.S. PATENT DOCUMENTS

2018/0307074 A1\* 10/2018 Xie .................. G06F 3/044
2018/0335865 A1\* 11/2018 Choi ................. G06F 3/041
2019/0235691 A1\*  8/2019 Kim .................. G06F 3/0416

\* cited by examiner

DISPLAY PANEL

RELATED APPLICATIONS

This application is a National Phase of PCT Patent Application No. PCT/CN2019/079557 having International filing date of Mar. 25, 2019, which claims the benefit of priority of Chinese Patent Application No. 201811454661.6 filed on Nov. 30, 2018. The contents of the above applications are all incorporated by reference as if fully set forth herein in their entirety.

FIELD AND BACKGROUND OF THE INVENTION

The present disclosure relates to the display field, and in particular, to a display panel.

At present, organic light-emitting diode (OLED) displays as display devices for displaying images have attracted much attention. Different from a liquid crystal display (LCD) device, an OLED display has a feature of self-illumination, and uses no separate light source, and therefore, can be manufactured to be thinner and lighter than a display device using a separate light source, to more easily implement a feature of flexible and foldable display. However, in a bottom luminescent OLED display, a thin film transistor (TFT) array, a light-emitting layer, and the like are successively formed on a surface of a substrate. Light emitted by the light-emitting layer reaches a human eye through the substrate. It is relatively difficult to integrate a touch layer to a panel in a process. In this case, it is relatively difficult to implement design of an in-cell touch manner.

Therefore, how to implement an in-cell touch manner for a display panel is a technical problem urgently to be resolved by a person skilled in the art.

Technical Problem

The present disclosure provides a display panel, to resolve a technical problem that in-cell touch cannot be implemented on a current display panel.

SUMMARY OF THE INVENTION

To resolve the foregoing problem, the technical solutions provided in the present disclosure are as follows:

The present disclosure provides a display panel. The display panel includes a substrate, a touch functional layer, and an array functional layer. The substrate includes a first substrate layer and a second substrate layer formed on the first substrate layer. The array functional layer is disposed on the substrate. At least one touch functional layer is formed between the first substrate layer and the second substrate layer.

The touch functional layer includes a first touch functional layer and a second touch functional layer. The first touch functional layer includes a plurality of drive electrodes and a plurality of metal wires connected to the drive electrodes. The second touch functional layer includes a plurality of sensing electrodes and a plurality of metal wires connected to the sensing electrodes.

The second substrate layer is provided with an exposed area. The array functional layer is provided with a via. A size of the exposed area is greater than a size of the via.

In the display panel provided in the present disclosure, the first touch functional layer is disposed on the second substrate layer close to the array functional layer.

In the display panel provided in the present disclosure, the first touch functional layer is disposed below the first substrate layer away from the array functional layer.

In the display panel provided in the present disclosure, a material of the first substrate layer is transparent metal.

The present disclosure provides a display panel. The display panel includes a substrate, a touch functional layer, and an array functional layer. The substrate includes a first substrate layer and a second substrate layer formed on the first substrate layer. The array functional layer is disposed on the substrate. At least one touch functional layer is formed between the first substrate layer and the second substrate layer.

In the display panel provided in the present disclosure, the touch functional layer includes a plurality of touch electrodes and a plurality of metal wires disposed on side surfaces of the touch electrodes.

In the display panel provided in the present disclosure, the touch functional layer includes a plurality of touch electrodes and a plurality of metal wires connected to the touch electrodes, and the touch electrodes and the metal wires are located in different planes.

In the display panel provided in the present disclosure, the touch functional layer includes a first touch functional layer and a second touch functional layer. The first touch functional layer includes a plurality of drive electrodes and a plurality of metal wires connected to the drive electrodes. The second touch functional layer includes a plurality of sensing electrodes and a plurality of metal wires connected to the sensing electrodes.

In the display panel provided in the present disclosure, a shape of the drive electrode includes a rhombus.

In the display panel provided in the present disclosure, a shape of the sensing electrode includes a rhombus.

In the display panel provided in the present disclosure, the first touch functional layer is disposed on the second substrate layer close to the array functional layer.

In the display panel provided in the present disclosure, the first touch functional layer is disposed below the first substrate layer away from the array functional layer.

In the display panel provided in the present disclosure, the first touch functional layer is disposed between the first substrate layer and the second substrate layer.

In the display panel provided in the present disclosure, the second touch functional layer is disposed on the second substrate layer close to the array layer.

In the display panel provided in the present disclosure, the second touch functional layer is disposed below the first substrate layer away from the array functional layer.

In the display panel provided in the present disclosure, the display panel further includes a light-emitting layer. The light-emitting layer is provided with a subpixel light-emitting area. The touch functional layer is provided with a blank area. The blank area corresponds to the subpixel light-emitting area.

In the display panel provided in the present disclosure, metal of the touch functional layer is non-transparent.

In the display panel provided in the present disclosure, the second substrate layer is provided with an exposed area. The array functional layer is provided with a via. A size of the exposed area is greater than a size of the via.

In the display panel provided in the present disclosure, the touch functional layer includes a display area and a non-display area. A locating plate is disposed in the display area.

In the display panel in the present invention, the touch functional layer includes a display area and a non-display area. A locating plate is disposed in the non-display area.

The present disclosure provides a display panel. The display panel includes a substrate, a touch functional layer, and an array functional layer. The substrate includes a first substrate layer and a second substrate layer formed on the first substrate layer. The array functional layer is disposed on the substrate. At least one touch functional layer is formed between the first substrate layer and the second substrate layer. The substrate is divided into the first substrate layer and the second substrate layer, and the at least one touch functional layer is disposed between the first substrate layer and the second substrate layer, to implement in-cell touch on the display panel.

BRIEF DESCRIPTION OF THE SEVERAL VIEWS OF THE DRAWINGS

To describe the technical solutions in the embodiments or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF SPECIFIC EMBODIMENTS OF THE INVENTION

The following embodiments are described with reference to the accompanying drawings, and are used to exemplify specific embodiments for implementation of the present disclosure. Terms about directions mentioned in the present disclosure, such as "upper", "lower", "front", "rear", "left", "right", "in", "out", and "side surface" merely refer to directions in the accompanying drawings. Therefore, the used terms about directions are used to describe and understand the present disclosure, and are not intended to limit the present disclosure. In the figures, units having similar structures are represented by using a same reference number.

In the present disclosure, for a technical problem that it is difficult to implement in-cell touch on a current display panel, the embodiments of the present disclosure can mitigate the problem.

Figure 1:
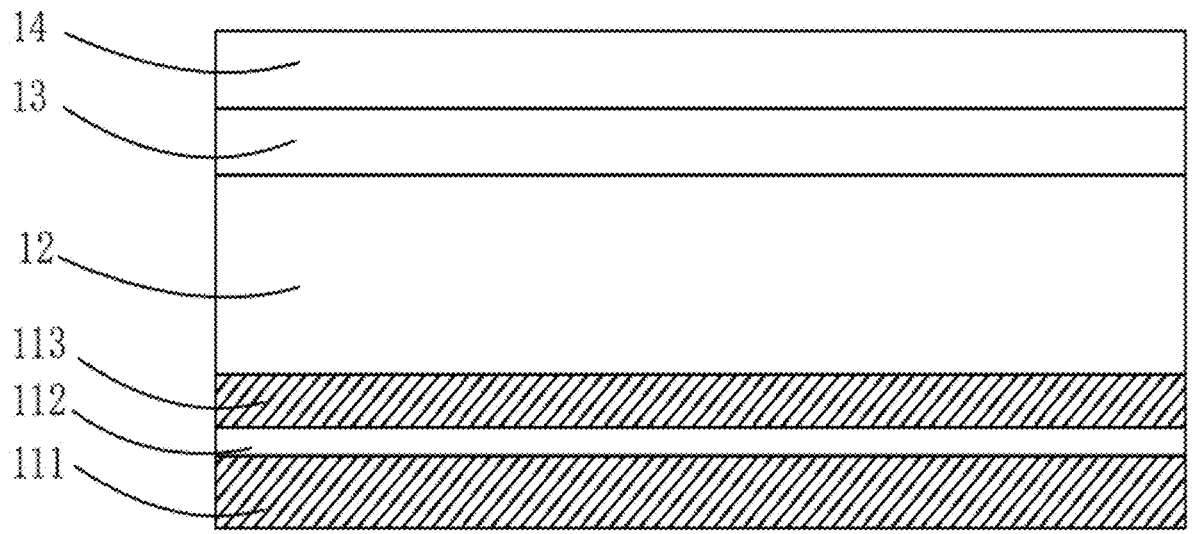
FIG. 1 is a schematic diagram of a first display panel according to an embodiment of the present disclosure.

As shown in FIG. 1, an embodiment of the present disclosure provides a display panel. The display panel includes a substrate, a touch functional layer 112, an array functional layer 12, a light-emitting layer 13, and a packaging layer 14. The substrate includes a first substrate layer 111 and a second substrate layer 113. The touch functional layer 112 is formed on the first substrate layer 111. The second substrate layer 113 is formed on the touch functional layer 112. The array functional layer 12 is electrically connected to the touch functional layer 112. The substrate is divided into the first substrate layer and the second substrate layer, the touch functional layer is formed on the first substrate layer, and then the second substrate layer is formed on the touch functional layer, to implement in-cell touch on the display panel.

Figure 2:
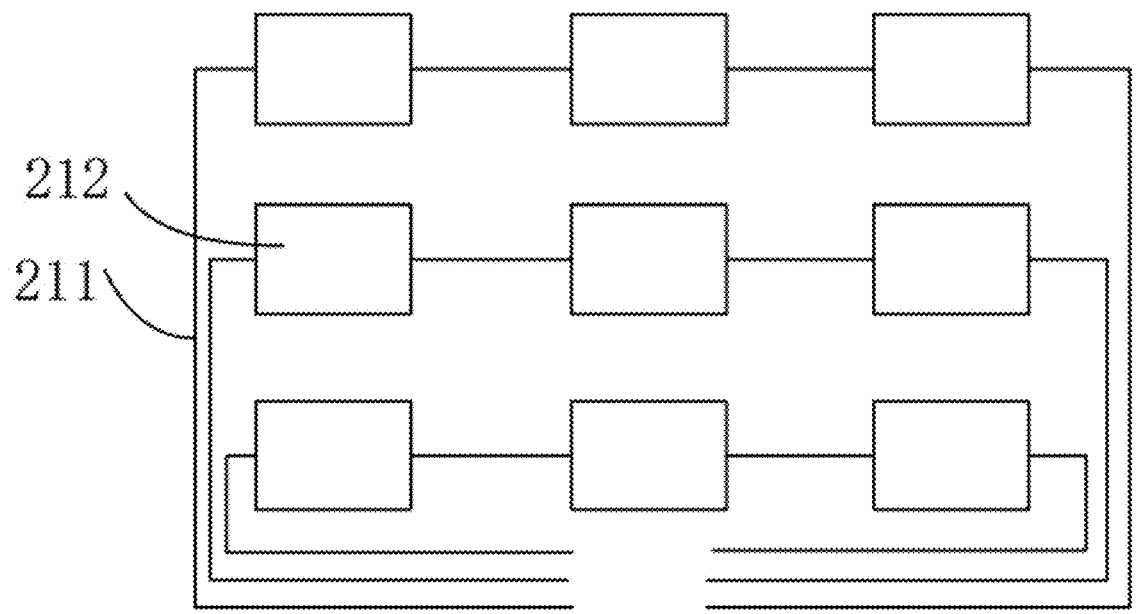
FIG. 2 is a schematic structural diagram of a first touch functional layer according to an embodiment of the present disclosure.
Figure 3:
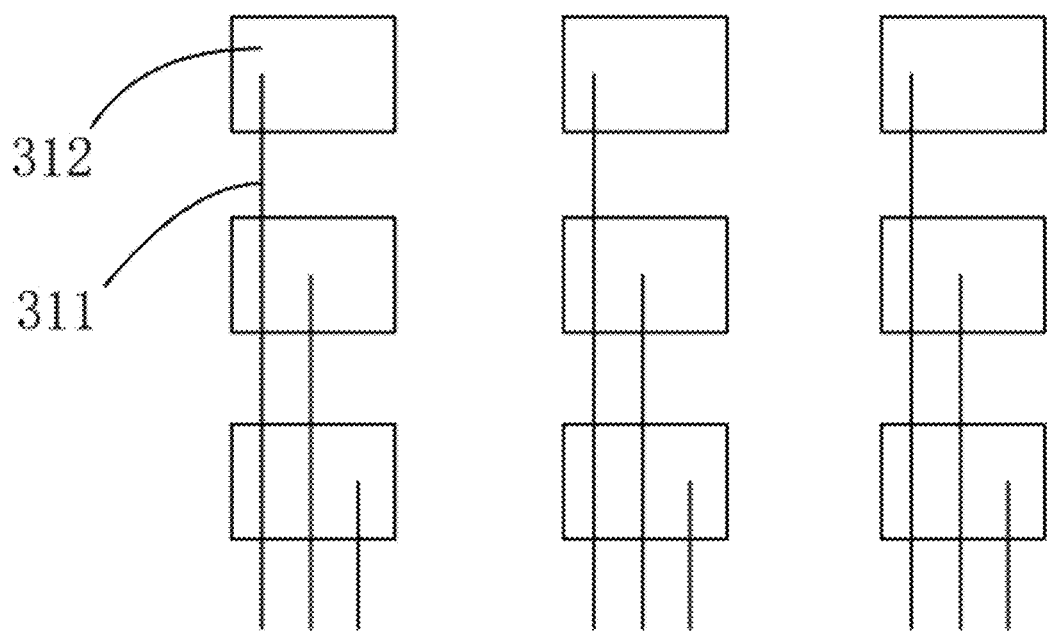
FIG. 3 is a schematic structural diagram of a second touch functional layer according to an embodiment of the present disclosure.

As shown in FIGS. 2 and 3, an embodiment of the present disclosure provides a touch functional layer. In the touch functional layer shown in FIG. 2, the touch functional layer includes a plurality of touch electrodes 212 and a plurality of metal wires 211 disposed on side surfaces of the touch electrodes 212. In the touch functional layer shown in FIG. 3, the touch functional layer includes a plurality of touch electrodes 312 and a plurality of metal wires 311. The metal wires 311 and the touch electrodes 312 are located in different planes. In the touch functional layer in the present disclosure, the metal wires and the touch electrodes are disposed on a same layer or the metal wires and the touch electrodes are disposed on different layers, and the touch functional layer is disposed between the first substrate layer and the second substrate layer, to reduce a thickness in comparison with an external touch device.

Figure 4:
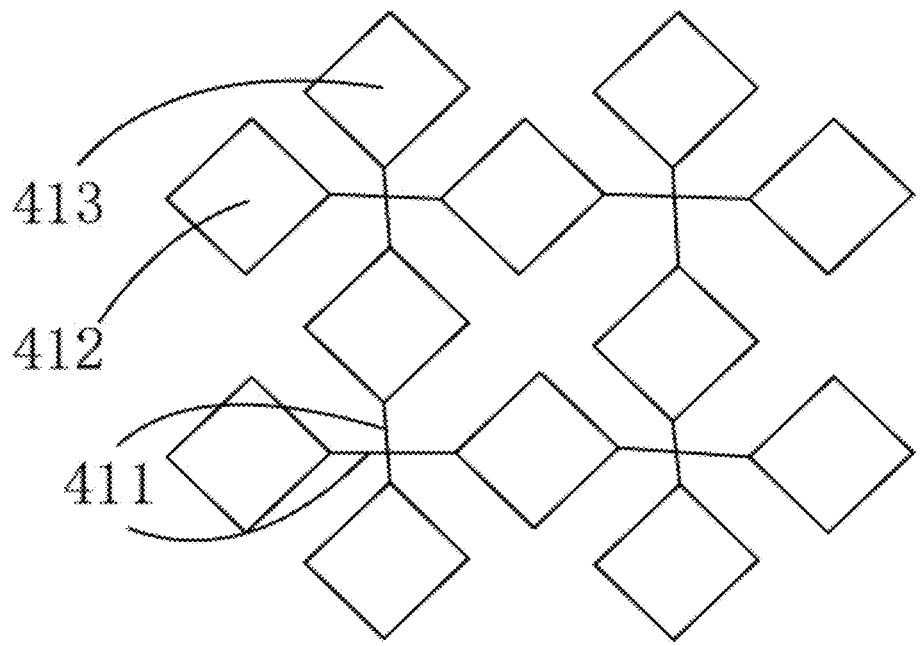
FIG. 4 is a schematic structural diagram of a third touch functional layer according to an embodiment of the present disclosure.

As shown in FIG. 4, an embodiment of the present disclosure provides a touch functional layer. The touch functional layer includes a first touch functional layer and a second touch functional layer. The first touch functional layer includes a plurality of drive electrodes 412 and a plurality of metal wires 411. The second touch functional layer includes a plurality of sensing electrodes 413 and a plurality of metal wires 411. The first touch functional layer and the second touch functional layer in the figure are located in different planes, but the present embodiment is not limited thereto. For example, the drive electrodes, the metal wires connected to the drive electrodes, and the sensing electrodes are located on a same layer, but the metal wires connected to the sensing electrodes form a bridge at an intersection located in another plane. In addition, a shape of the drive electrode in the present embodiment of the present disclosure may be a triangle, a rhombus, a quadrangle, or another shape, or the drive electrode may be a mesh electrode. A shape of the sensing electrode may be a triangle, a rhombus, a quadrangle, or another shape, or the sensing electrode may be a mesh electrode. The touch functional layer is divided into the first touch functional layer and the second touch functional layer. At least one of the first touch functional layer and the second touch functional layer is disposed between the first substrate layer and the second substrate layer, or the first touch functional layer and the second touch functional layer may be both disposed between the first substrate layer and the second substrate layer, or the first touch functional layer may be disposed between the first substrate layer and the second substrate layer, while the second substrate layer may be disposed below the first substrate layer or on the second substrate layer, or the second touch functional layer may be disposed between the first substrate layer and the second substrate layer, while the first touch functional layer is disposed below the first substrate layer or on the second substrate layer, to implement in-cell touch on the display panel.

Figure 5:
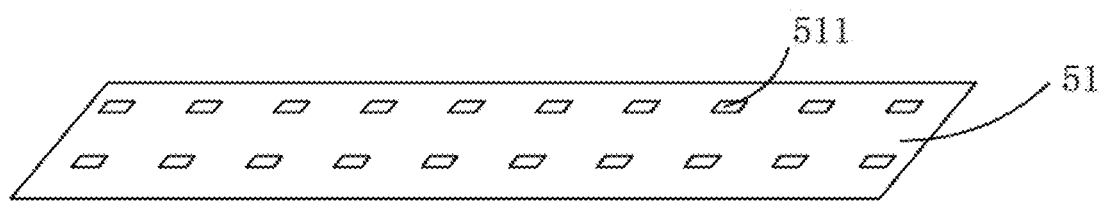
FIG. 5 is a schematic structural diagram of a fourth touch functional layer according to an embodiment of the present disclosure.

As shown in FIG. 5, an embodiment of the present disclosure provides a touch functional layer. A cutout area 511 is disposed on the touch functional layer 51. The cutout area corresponds to a position of a subpixel light-emitting device, so that light from the light-emitting layer can be transmitted through the cutout area. Therefore, for selection of a material of the touch functional layer, transparent metal or non-transparent metal may be selected.

Figure 6:
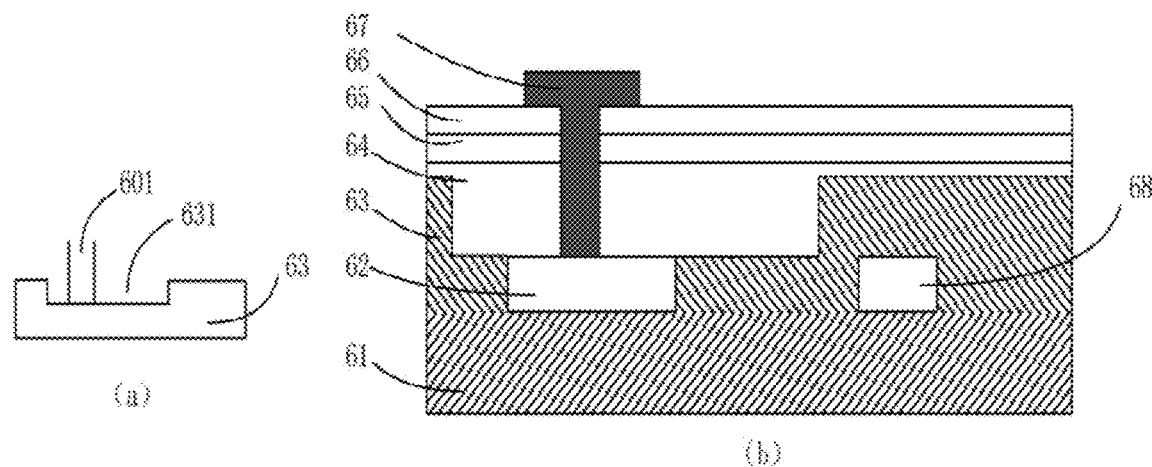
FIG. 6 is a schematic diagram of a connection between a touch functional layer and an array functional layer according to an embodiment of the present disclosure.

As shown in FIG. 6, an embodiment of the present disclosure provides a connection structure of a touch functional layer and an array functional layer. As shown in (a) in FIG. 6, a second substrate layer 63 is provided with an exposed area 631, and the array functional layer is provided with a via 601. As shown in (b) in FIG. 6, a touch functional layer 62 is formed on a first substrate layer 61, and a second substrate layer 63 is formed on the touch functional layer 62. The array functional layer includes a buffer layer 64, a gate insulation layer 65, an inter-layer insulation layer 66, and a source/drain layer 67. A locating plate 68 is further disposed on the touch functional layer. The exposed area is disposed on the second substrate layer, and the via is provided on the array functional layer. Connection metal is disposed in the via. A connection terminal is disposed on the touch functional layer, so that the connection metal is connected to the connection terminal on the touch functional layer, to implement an electrical connection between the array functional layer and the touch functional layer, and the connection metal is connected to a touch control chip, to control the display. A size of the exposed area on the second substrate layer is set to be greater than a size of the via, so that the second substrate layer can be more easily formed in a process.

In the touch functional layer provided in the present disclosure, the locating plate may be formed in the display area on the touch functional layer, or may be formed in the non-display area on the touch functional layer. The locating plate can perform accurate locating. The exposed area on the second substrate layer is disposed above the connection terminal on the touch functional layer, and the locating plate may be further used as a registration mark for manufacturing the array functional layer subsequently.

Figure 7:
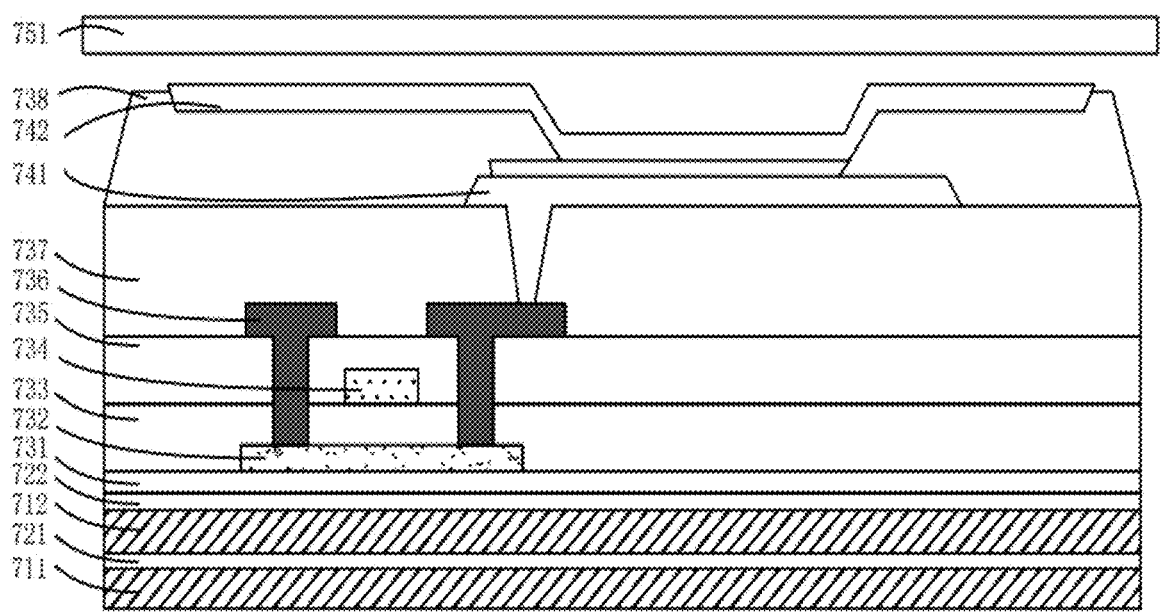
FIG. 7 is a schematic diagram of a second display panel according to an embodiment of the present disclosure.

As shown in FIG. 7, an embodiment of the present disclosure provides a display panel, including a substrate, a touch functional layer, an array functional layer, a light-emitting layer, and a packaging layer 751. The substrate includes a first substrate layer 711 and a second substrate layer 712. The touch functional layer includes a first touch functional layer 721 and a second touch functional layer 722. The array functional layer includes a buffer layer 722, a semiconductor active layer 732, a gate insulation layer 733, a gate layer 734, an inter-layer insulation layer 735, a source/drain layer 736, a planarization layer 737, and a pixel definition layer 738. The light-emitting layer includes an anode 741 and a cathode 742 and a light-emitting material layer between the two electrodes. The first touch functional layer 721 is disposed between the first substrate layer 711 and the second substrate layer 712. The second touch functional layer 722 is disposed on the second substrate layer 722.

In the display panel provided in the embodiments of the present disclosure, the first touch functional layer is disposed between the first substrate layer and the second substrate layer, to implement in-cell touch on the display panel, and then is electrically connected to the array functional layer through the via on the second substrate layer, but the embodiments are not limited thereto. The touch functional layer may be disposed between the first substrate layer and the second substrate layer. Either one of the layers of the touch functional layer having a double-layer structure may be disposed between the first substrate layer and the second substrate layer, and the other touch functional layer may be disposed below the first substrate layer or disposed on the second substrate layer. The foregoing structure may be used in the touch functional layer, to reduce a process difficulty and improve light transmission of the display panel.

In the foregoing embodiments, a process of manufacturing the display panel is as follows: The touch functional layer and the locating plate are formed on the first substrate layer. Then the second substrate layer is formed on the touch functional layer by using a process such as a transfer printing method. In addition, the exposed area is disposed on the second substrate layer. The locating plate is used for locating, and the exposed area is disposed on the connection terminal on the touch functional layer. Subsequently, the array functional layer is formed on the second substrate layer. The array functional layer is provided with the via. The via on the array functional layer corresponds to the connection terminal through the locating plate. The connection metal on the array functional layer is electrically connected to the connection terminal on the touch layer through the via. Next, the connection metal is connected to the touch control chip, to control the display panel. The connection metal and a gate line are manufactured by using a same process and a same material, or the connection metal and another layer of metal of the array layer are manufactured by using a same process and a same material, or the connection metal is jointly formed by a plurality of layers of metal of the array layer. A material of each of the first substrate layer and the second substrate layer may be an organic material such as polyimide (PI), polycarbonate (PC), polyethersulfone (PES), or polyethylene terephthalate (PET), or the first substrate layer may be a thin transparent glass or thin transparent metal.

It can be learned from the embodiments of the present disclosure that:

The embodiments of the present disclosure provide a display panel. The display panel includes a substrate, a touch functional layer, and an array functional layer. The substrate includes a first substrate layer and a second substrate layer formed on the first substrate layer. The array functional layer is disposed on the substrate. At least one touch functional layer is formed between the first substrate layer and the second substrate layer. The touch functional layer is disposed between the first substrate layer and the second substrate layer, to implement in-cell touch on the display panel. In addition, for touch functional layers having different structures, one of the touch functional layers may be disposed between the first substrate layer and the second substrate layer, and another layer is disposed below the first substrate layer or on the second substrate layer, to implement in-cell touch. For a touch functional layer having a single-layer structure, the display panel can be lighter and thinner. A locating plate is disposed on the touch functional layer, so that an exposed area on the second substrate layer can be accurately disposed on a connection terminal of the touch functional layer, and the locating plate may be further used as a registration mark for manufacturing the array layer on a surface of the substrate subsequently. A size of the exposed area on the second substrate layer is set to be greater than a size of a via on the array functional layer, so that the second substrate layer can be more easily formed, to reduce a process difficulty. An area on the touch functional layer is cut out relative to a subpixel light emitting device, so that metal of the touch functional layer may use non-transparent metal. Based on the foregoing embodiments, the embodiments of the present disclosure implement in-cell touch on the display panel, so that a touch display is lighter and thinner.

In conclusion, the present disclosure has been disclosed above through preferred embodiments; however, the preferred embodiments are not intended to limit the present disclosure, and a person of ordinary skill in the art can make various modifications and improvements without departing from the spirit and scope of the present disclosure; therefore, the protection scope of the present disclosure should be subject to the scope defined by the claims.

What is claimed is:

1. A display panel, comprising a substrate, a touch functional layer, and an array functional layer, wherein the substrate comprises a first substrate layer and a second substrate layer formed on the first substrate layer, the array functional layer is disposed on the substrate, and at least one touch functional layer is formed between the first substrate layer and the second substrate layer;

the touch functional layer comprising a first touch functional layer and a second touch functional layer, the first touch functional layer comprising a plurality of drive electrodes and a plurality of metal wires connected to the drive electrodes, and the second touch functional layer comprising a plurality of sensing electrodes and a plurality of metal wires connected to the sensing electrodes; and the second substrate layer being provided with an exposed area to expose the touch functional layer, the array functional layer being provided with a via for electrically connecting the touch functional layer to the array functional layer, and a size of the exposed area being greater than a size of the via.

2. The display panel according to claim 1, wherein the first touch functional layer is disposed on the second substrate layer close to the array functional layer.

3. The display panel according to claim 1, wherein the first touch functional layer is disposed below the first substrate layer away from the array functional layer.

4. The display panel according to claim 1, wherein a material of the first substrate layer is transparent metal.

5. A display panel, comprising a substrate, at least one touch functional layer, and an array functional layer, wherein the substrate comprises a first substrate layer and a second substrate layer formed on the first substrate layer, the array functional layer is disposed on the substrate, and the at least one touch functional layer is formed between the first substrate layer and the second substrate layer, wherein the second substrate layer is provided with an exposed area to expose the touch functional layer, and the array functional layer is provided with a via for electrically connecting the touch functional layer to the array functional layer.

6. The display panel according to claim 5, wherein the touch functional layer comprises a plurality of touch electrodes and a plurality of metal wires disposed on side surfaces of the touch electrodes.

7. The display panel according to claim 5, wherein the touch functional layer comprises a plurality of touch electrodes and a plurality of metal wires connected to the touch electrodes, and the touch electrodes and the metal wires are located in different planes.

8. The display panel according to claim 5, wherein the touch functional layer comprises a first touch functional layer and a second touch functional layer, the first touch functional layer comprises a plurality of drive electrodes and a plurality of metal wires connected to the drive electrodes, and the second touch functional layer comprises a plurality of sensing electrodes and a plurality of metal wires connected to the sensing electrodes.

9. The display panel according to claim 8, wherein shapes of the drive electrodes comprise a rhombus.

10. The display panel according to claim 8, wherein shapes of the sensing electrodes comprise a rhombus.

11. The display panel according to claim 8, wherein the first touch functional layer is disposed on the second substrate layer close to the array functional layer.

12. The display panel according to claim 8, wherein the first touch functional layer is disposed below the first substrate layer away from the array functional layer.

13. The display panel according to claim 5, wherein the first touch functional layer is disposed between the first substrate layer and the second substrate layer.

14. The display panel according to claim 13, wherein the second touch functional layer is disposed on the second substrate layer close to the array layer.

15. The display panel according to claim 13, wherein the second touch functional layer is disposed below the first substrate layer away from the array functional layer.

16. The display panel according to claim 5, wherein the display panel further comprises a light-emitting layer provided with a subpixel light-emitting area, and the touch functional layer is provided with a blank area corresponding to the subpixel light-emitting area.

17. The display panel according to claim 16, wherein metal of the touch functional layer is non-transparent.

18. The display panel according to claim 5, wherein a size of the exposed area is greater than a size of the via.

19. The display panel according to claim 5, wherein the touch functional layer comprises a display area and a non-display area, and a locating plate is disposed in the display area.

20. The display panel according to claim 5, wherein the touch functional layer comprises a display area and a non-display area, and a locating plate is disposed in the non-display area.

* * * * *